US012657334B1

(12) United States Patent
Wagner et al.

(10) Patent No.: US 12,657,334 B1
(45) Date of Patent: Jun. 16, 2026

(54) GENERATING PRIVACY-PRESERVING KERNEL DENSITY ESTIMATES

(71) Applicant: Amazon Technologies, Inc., Seattle, WA (US)

(72) Inventors: Tal Wagner, Palo Alto, CA (US); Yonatan Naamad, Sunnyvale, CA (US); Nina Mishra, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 284 days.

(21) Appl. No.: 18/194,556

(22) Filed: Mar. 31, 2023

(51) Int. Cl.
*G06F 21/62* (2013.01)
*G06N 20/10* (2019.01)

(52) U.S. Cl.
CPC ......... *G06F 21/6245* (2013.01); *G06N 20/10* (2019.01)

(58) Field of Classification Search
CPC ............................ G06F 21/6245; G06N 20/10
See application file for complete search history.

(56) References Cited

U.S. PATENT DOCUMENTS

| | | | | |
|---|---|---|---|---|
| 8,619,984 | B2 | 12/2013 | Mcsherry | |
| 10,817,394 | B2 * | 10/2020 | Oba .................... | G06F 11/2257 |
| 11,101,979 | B2 * | 8/2021 | Fletcher .................. | G06N 7/01 |
| 11,385,633 | B2 * | 7/2022 | Hazard ................. | G06V 10/454 |
| 11,593,360 | B2 * | 2/2023 | Burchard ............ | G06F 21/6227 |
| 11,605,231 | B2 * | 3/2023 | Velipasalar .......... | G08B 13/193 |
| 11,640,561 | B2 * | 5/2023 | Hazard ............... | G06F 18/2148 |
| | | | | 382/159 |

| | | | | |
|---|---|---|---|---|
| 11,671,241 | B2 * | 6/2023 | Ganguly ............... | H04L 9/0643 |
| | | | | 706/20 |
| 11,676,069 | B2 * | 6/2023 | Hazard .................. | G06N 20/00 |
| | | | | 706/12 |
| 11,727,286 | B2 * | 8/2023 | Hazard .................... | G06N 5/04 |
| | | | | 706/12 |
| 12,154,041 | B2 * | 11/2024 | Hazard .................... | G06N 5/04 |
| 12,175,386 | B2 * | 12/2024 | Hazard ................. | G06N 5/022 |
| 12,265,639 | B2 * | 4/2025 | Hosudurg ............. | G06F 21/604 |
| 2019/0095300 | A1 * | 3/2019 | Oba .................... | G05B 23/0281 |
| 2020/0089967 | A1 * | 3/2020 | Velipasalar ........... | G06T 3/4046 |
| 2020/0382281 | A1 * | 12/2020 | Fletcher .................. | G06N 7/01 |

(Continued)

OTHER PUBLICATIONS

Joseph Gallego et al., Fast Kernel Density Estimation with Density Matrices and Random Fourier Features 1-9 (Aug. 2022) (Year: 2022).*

Alexandr Andoni. "Nearest neighbor search: the old, the new, and the impossible," PHD thesis, Massachusetts Institute of Technology, 2009, pp. 1-178.

(Continued)

*Primary Examiner* — Sharon S Lynch

(74) *Attorney, Agent, or Firm* — S. Scott Foster; Kowert, Hood, Munyon, Rankin & Goetzel, P.C.

(57) ABSTRACT

Privacy-preserving Kernel Density Estimations (KDEs) may be provided. A data set with data subject to privacy restrictions may be sampled to generate a set of linear measurements. An amount of noise may be added to the set of linear measurements to ensure privacy. Then when shared with a recipient, the noise-modified set of linear measurements can be used to generate privacy-preserving KDE values for features in the data set using a corresponding estimation function with the same values of parameters in the linear measurement function. Privacy-preserving KDE values may then be used to generate synthetic data sets that do not violate privacy restrictions on the source data set.

20 Claims, 9 Drawing Sheets

(56) References Cited

U.S. PATENT DOCUMENTS

| | | | | |
|---|---|---|---|---|
| 2021/0012246 A1* | 1/2021 | Hazard | .................... | G06N 7/01 |
| 2021/0019556 A1* | 1/2021 | Ganguly | .......... | G06F 18/24137 |
| 2021/0064610 A1* | 3/2021 | Burchard | ............ | G06F 18/2321 |
| 2021/0312307 A1* | 10/2021 | Hazard | ................. | G06N 5/022 |
| 2021/0326652 A1* | 10/2021 | Hazard | ................. | G06N 5/045 |
| 2023/0024796 A1* | 1/2023 | Hazard | .................... | G06N 5/04 |
| 2023/0130637 A1* | 4/2023 | Hosudurg | ......... | G06F 16/24568 726/1 |
| 2023/0140834 A9* | 5/2023 | Hazard | .................... | G06N 7/01 382/159 |
| 2023/0148457 A9* | 5/2023 | Hazard | ................. | G06N 20/00 706/12 |
| 2023/0148458 A9* | 5/2023 | Hazard | .................... | G06N 5/04 706/12 |
| 2023/0161782 A1* | 5/2023 | Burchard | ............. | G06F 16/248 707/722 |
| 2023/0244964 A1* | 8/2023 | Hazard | ................. | G06N 20/00 706/12 |
| 2023/0342640 A1* | 10/2023 | Hazard | ................. | G06N 20/00 |
| 2024/0265484 A1* | 8/2024 | Hazard | ................. | G06T 1/0028 |
| 2025/0173590 A1* | 5/2025 | Hazard | ................. | G06N 20/00 |

OTHER PUBLICATIONS

Francesco Alda and Benjamin IP Rubinstein. "The bernstein mechanism: Function release under differential privacy". In Thirty-First AAAI Conference on Artificial Intelligence, 2017, pp. 1705-1711.

Benjamin Coleman and Anshumali Shrivastava. "A One-Pass Distributed and Private Sketch for Kernel Sums with Applications to Machine Learning at Scale," In Proceedings of the ACM SIGSAC Conference on Computer and Communications Security (CCS), p. 3252-3265, 2021.

Leslie Greengard and John Strain. "The fast gauss transform". SIAM Journal on Scientific and Statistical Computing, 12(1):pp. 79-94, 1991 Society for Industrial and Applied Mathematics.

Rob Hall, Alessandro Rinaldo, and Larry Wasserman. "Differential privacy for functions and functional data". Journal of Machine Learning Research, 14(Feb.): pp. 703-727, 2013.

Ali Rahimi and Benjamin Recht. "Random features for large-scale kernel machines". Advances in neural information processing systems, 20, 2007, pp. 1-10.

Simon J Sheather and Michael C Jones. "A reliable data-based bandwidth selection method for kernel density estimation". Journal of the Royal Statistical Society: Series B (Methodological), 53(3): pp. 683-690, 1991.

* cited by examiner

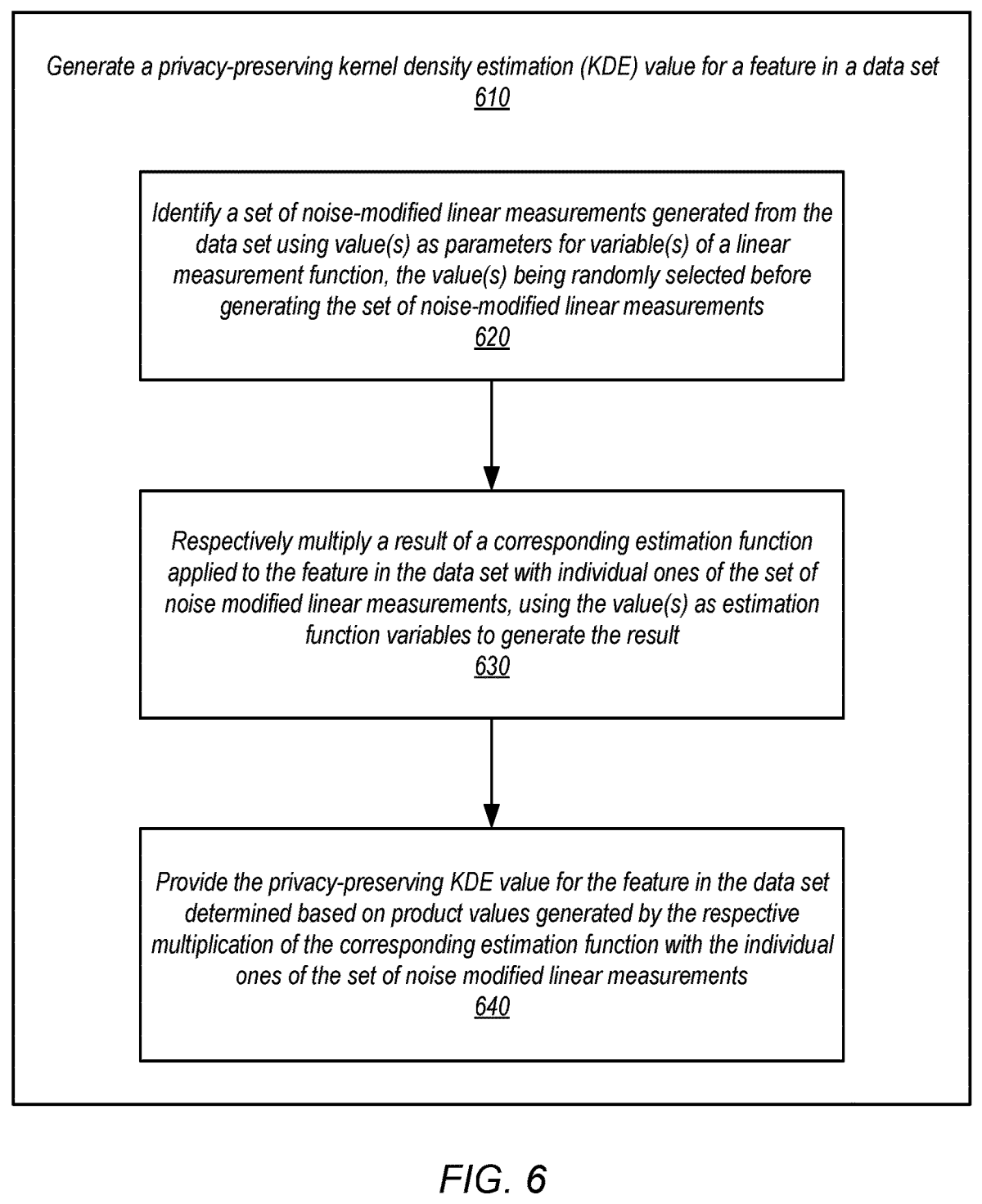

*Generate a privacy-preserving kernel density estimation (KDE) value for a feature in a data set*
<u>610</u>

*Identify a set of noise-modified linear measurements generated from the data set using value(s) as parameters for variable(s) of a linear measurement function, the value(s) being randomly selected before generating the set of noise-modified linear measurements*
<u>620</u>

*Respectively multiply a result of a corresponding estimation function applied to the feature in the data set with individual ones of the set of noise modified linear measurements, using the value(s) as estimation function variables to generate the result*
<u>630</u>

*Provide the privacy-preserving KDE value for the feature in the data set determined based on product values generated by the respective multiplication of the corresponding estimation function with the individual ones of the set of noise modified linear measurements*
<u>640</u>

*FIG. 6*

GENERATING PRIVACY-PRESERVING KERNEL DENSITY ESTIMATES

BACKGROUND

High quality data sets provide important insights that drive innovation across many different technological areas. The performance of machine learning models, for instance, may be highly dependent upon the quality of a given data set for training the machine learning model. Similarly, other analyses or data-driven solutions may depend upon access to high quality data sets to achieve good performance in real-world environments. Therefore, removing barriers to obtaining high quality data sets may be highly desirable.

BRIEF DESCRIPTION OF THE DRAWINGS

FIG. 6 illustrates a high-level flowchart of various methods and techniques to implement generating privacy-preserving Kernel Density Estimates from noise-modified sets of linear measurements, according to some embodiments.

Figure 1:
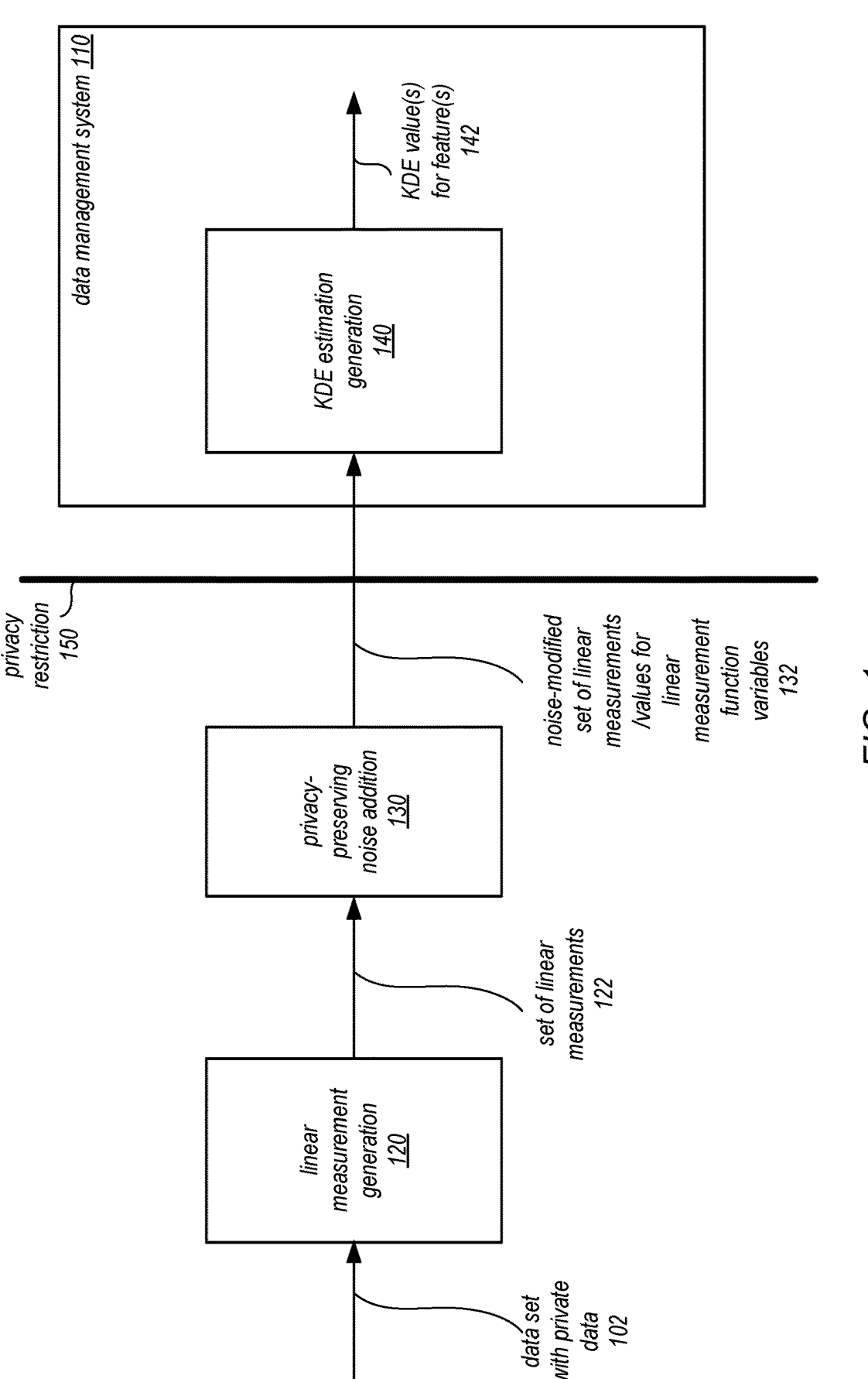
FIG. 1 illustrates a logical block diagram of generating privacy-preserving Kernel Density Estimates, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of generating privacy-preserving Kernel Density Estimates are described herein. Data sets may be generated in many different contexts. Often, these data sets may contain items (e.g., records or other data objects) with many different features (e.g., field values or other attributes). Some of these features may, for various reasons, be under privacy restrictions. Privacy restrictions may be imposed externally according to statutory or other regulatory schemes (e.g., preserving individual person privacy). Privacy restrictions may also be self-imposed for competitive or other context-specific reasons (e.g., to preserve sensitive organization information from competitors). Privacy restrictions may also impose retention policies, which may limit the amount of time data may be retained (e.g., no more than 2 years).

In spite of these privacy restrictions, there may be many beneficial reasons for sharing data sets. For example, training of machine learning models often relies on large, accurate data sets in order to generate an accurate model. These models in turn power a variety of beneficial computerized functions, such as generation of artificial intelligence applications. However, in at least some cases, such models due to their design can output data that is substantially similar to data used to train the models. Accordingly, it may not be possible to train such models on data sets with privacy restrictions. As a result, the data available to train these models is restricted, the accuracy of the models is reduced, and the resulting applications powered by such models are impaired. Synthetic data sets can avoid this problem, insomuch as they can be created without private, confidential, or otherwise sensitive information. However, current methods for generation of synthetic data sets often result in inaccuracies in the synthetic data. This, in turn, results in inaccuracies in trained machine learning models. The present disclosure provides solutions to the technical problem of creating accurate synthetic data sets. For example, as discussed below, embodiments of the present disclosure can utilize kernel density estimates (KDEs) generated from a real data set to enable creation of highly accurate synthetic data sets without inclusion of private, confidential, or otherwise sensitive information from the real data set. Moreover, embodiments of the present disclosure provide for generation of synthetic data from a real data set in a computationally efficient manner, reducing the computing resources required to create synthetic data relative to past techniques. Accordingly, embodiments as disclosed herein provide for improvements in generation of synthetic data and in computer-related technologies in general.

For example, synthetic data sets with high similarities to the data sets with privacy restrictions can be generated which do not violate enforced privacy restrictions. Instead, these synthetic data sets may be shared with entities to perform custom analysis or application development (e.g., training machine learning models and implementing applications based on the machine learning models, improving their performance with more and potentially higher quality data obtained from the synthetic data sets). Some synthetic data sets may be shared within an organization in order to facilitate cross organization learning or support other operations. Some synthetic data sets may be useful for broader communities to support, for example, scientific research, or support community-wide application development efforts. For at least these reasons, generating and sharing synthetic data sets without violating privacy restrictions may offer many performance benefits for development in computer-related technologies.

Moreover, the embodiments below may allow for other analysis techniques that utilize privacy-preserving KDE values without generating a synthetic data set. These privacy-preserving KDE values can, for instance, provide insights into the characteristics of the data set when examined with respective to particular features (e.g., as would be features of prospective items of a data set). For example, the KDE values can be probability density estimates usable to determine the likelihood of an event or other state captured in the data set given particular features of a prospective item. Consider a scenario where privacy restrictions on medical data sets can limit use of the data set so that patient privacy is not violated. Privacy-preserving KDE values for features such as age, location, pre-existing conditions, or other features can be used to determine their respective likelihood of occurrence with respect to some medical event based on the data set without allowing actual patient information in the data set to leak out in violation of patient privacy.

In various embodiments, in order to provide a good approximation of a data set (e.g., preserving the properties of the data set) without violating a privacy restriction, a synthetic data set may be generated based on an approximation of the data set as noted above. For example, there may be an underlying distribution D of a data set X. If access could be provided to the underlying distribution D random samples could be determined and used to create the synthetic data set. One technique for creating a distribution for a data set is to use a Kernel Density technique. In this approach, a "smooth" distribution is obtained from a set of points X by convolving it with a kernel function $k: \mathbb{R}^d \times \mathbb{R}^d \to [0, 1]$. The density estimate is defined as:

$$KDE_X(y) = \frac{1}{|X|} \sum_{x \in X} k(y, x)$$

For example, if the kernel function is a Gaussian distribution, represented as $$k(y, x) = \exp\left(\frac{-\|x - y\|^2}{\sigma^2}\right)$$

then, a Gaussian may be dropped on each point in the data set and then a summation of the Gaussians may be taken in order to obtain a smooth distribution, which provides the Kernel Density Estimate (KDE). (The bandwidth of the Gaussian is $\sigma$).

While the true KDE values of a data set do not directly provide items with privacy restrictions, features of the items in the data set can be discoverable (sometimes referred to as data leak by analyzing the results of true KDE values for prospective items). In order to preserve privacy, an approximation of the true KDE may be determined and used instead, as discussed in detail below. In some embodiments, it may be desirable to have an approximation of the KDE to deviate by no more than a from the true KDE. This may be described, where $\hat{f}: [0, 1]^d \to [0, 1]$ may be a randomized mapping, and let $\alpha, \eta > 0$. It may then be said that $\hat{f}$ is an $(\alpha, \eta)$-additive approximation for $KDE_X(\bullet)$ if for every $y \in \mathbb{R}^d$, where y represents value(s) of feature(s) of a prospective item, $$Pr[|\hat{f}(y) - KDE_X(y)| \leq \alpha \geq 1 - \eta].$$

In various embodiments, privacy-preserving KDEs may be used to generate synthetic data sets by randomly sampling a KDE that approximates a data set while not violating privacy restrictions. Differential privacy techniques may be used to define and apply noise to preserve privacy. In differential privacy, the addition or removal of an item from the data set should not change the outcome. This may be described as D, $D' \in \mathbb{R}^d$ which may be two data sets that differ in at most one data point. A randomized mechanism $M: \mathbb{R}^d \to \mathbb{R}$ is $(\epsilon)$-differentially private if for all pairs of data sets that differ in at most one point and for all measurable $S \subseteq \mathbb{R}$:

$$Pr[M(D) \in S] \leq e^\epsilon Pr[M(D') \in S]$$

Accordingly, in various embodiments, samples may be generated from approximate KDE values that are differentially private.

FIG. 1 illustrates a logical block diagram of generating privacy-preserving Kernel Density Estimates, according to some embodiments. As illustrated in FIG. 1, some data set owner, curator, or other data set source may have a data set with private data, which may be subject to some privacy restriction 150. The private data in the data set may not be shared in violation of privacy restriction. Accordingly, the data set owner, curator, or other data set source may generate the artifacts that preserve privacy and can be used to generate privacy-preserving KDEs by a recipient. As discussed below with regard to FIG. 3, a client application or other tool may be implemented, in various embodiments, to generate these artifacts.

For example, the data set X with data subject to a privacy limitation may be accessed and used to generate a set of linear measurements, as indicated at 120. Thus, the data set X may be described as:

$$X \subset \mathbb{R}^d$$

which may be a set of real items in a data set that have one or multiple features (sometimes referred to as dimensions, d) and a locality sensitive quantization (LSQ) technique may be applied to generate the approximate KDE values that preserve privacy. The LSQ technique may utilize a distribution over pairs of functions $(f, g)$ such that $f$ is a set of linear measurements of the data set. In various embodiments, the set of linear measurements may be few, bounded, and sparse. The other function, g, may be used to generate KDE estimates from the linear measurements.

In various embodiments, linear measurement generation 120 may be described as:

$$F(X) = \frac{1}{|X|} \sum_{x \in X} f(x)$$

A random selection of items from the data set (some number of x items) be used as input into the linear measurement function $f$. These x values may be vectors or other representations of items in the data set with one or multiple features. These vectors or other representations may locate a respective item x in a feature space that is a multi-dimensional space representing the different features of an item (e.g., age, weight, location, pre-existing conditions, or other features described in the example medical data set above). As discussed in detail in the examples of linear measurement functions, linear measurement functions may represent linear measurements of randomly select x values in the feature space that can then be used to generate privacy-preserving KDE values.

Different techniques may be used to generate the set of linear measurements, using different functions $f$. For example, in some embodiments, a Random Fourier Features (RFF) technique may be used. RFF may be beneficial in scenarios where there is high-dimensional data (e.g., a large number of features). RFF may be described as:

$$e^{-\|x-y\|_2^2} = \mathbb{E}_{\substack{\omega \sim N(o,\mathbb{1}_d) \\ \beta \sim Uni[0,2\pi)}} \left[ 2\cos\left(\sqrt{2} \cdot \omega^T x + \beta\right) \cdot \cos\left(\sqrt{2} \cdot \omega^T y + \beta\right) \right]$$

Linear measurement functions may be component of the RFF technique illustrated above (a corresponding estimation function may be the remaining component). Thus the $f$ function for RFF may be:

$$F(X) = \frac{1}{|X|} \sum_{x \in X} \cos\left(\sqrt{2} \cdot \omega^T x + \beta\right)$$

In the RFF technique, the $f$ function may utilize the x item (e.g., as a feature vector) as well as using values of parameters $\omega$ which may describe a direction in feature space and b which may describe an intercept, to be projected onto $\omega$, along with some addition $\beta$. Thus, use of these parameter values may inform how feature space is considered when generating the linear measurements. The values of parameters $\omega$ and $\beta$ may be randomly selected within the following ranges:

$$\omega \sim N(0, \mathbb{1}_d), \beta \sim Uni[0,2\pi)$$

and may be provided along with the noise-modified set of linear measurements as discussed below.

In some embodiments, another technique used to generate the set of linear measurements may be a Fast Gaussian Transform (FGT) technique. FGT may be beneficial in scenarios where there is low-dimensional data (e.g., low numbers of features). Like RFF, the $f$ and g functions may be components of the FGT technique which is based on an expansion of the Gaussian kernel. For example, the expansion of the Gaussian kernel may be described as:

$$e^{-\|x-y\|_2^2} = \sum_{r_1=1}^{\infty} \cdots \sum_{r_d=1}^{\infty} \prod_{j=1}^{d} (x_j - z_j)^{r_j} \cdot \frac{1}{r_j!} h_{r_j}(y_j - z_j)$$

where, $h_{r_j}$ may be a Hermite function and where the equation holds for every z in $\mathbb{R}^d$. In this example, the $f$ function for FGT-based technique using this expansion may be described as:

$$f_{H,r}(x) = \begin{cases} \prod_{j=1}^{d} (x_j - z_j^H)^{r_j} & \text{if } x \in H \\ 0 & \text{otherwise} \end{cases}$$

6 where r is a vector with non-negative integer coordinates, H is a cell in the unit grid in $R^d$ and $z^H$ the center point of H. The set of linear measurements determined may repeat the function a number of times for different randomly select x items, as discussed above. a linear measurement function variable may be the value specified for parameter r. This value of the parameter may be randomly selected, similar to the discussion above.

The set of linear measurements 122 generated using the various techniques discussed above may then be modified at privacy-preserving noise addition 130. Noise may be added to satisfy differential privacy which, as noted above, is satisfied when the addition or removal of an item from the data set does not change the outcome of an analysis performed on the noise modified data. As discussed above, differential privacy techniques may be implemented such as a Laplace mechanism, Lap, which applies a Laplace distribution to produce noise for a given operation, in this case the LSQ (which is implemented using both the $f$ and g function pair) in accordance with the privacy factor $\epsilon$. For instance, the addition of privacy-preserving noise may be described as:

$$\tilde{F}(X) = F(X) + \text{Lap}\left(\frac{C_{LSQ}}{\epsilon}\right)$$

wherein the noise amount determined according to the Laplace mechanism is added to the set of linear measurements, F(X) to produce the noise-modified set of linear measurements, $\tilde{F}(X)$.

As indicated at 132, both the noise-modified set of linear measurements, $\tilde{F}(X)$, and values for the linear measurement function variables (e.g., $\omega$ or $\beta$ for RFF or r for FGT) may be provided to a recipient, such as data management system 110 without violating privacy restriction 150. These artifacts, the noise-modified set of linear measurements and values of the parameters, may be stored in a catalog, listing, or other set of data sets with privacy preserved and selectable for generating synthetic data sets using generated privacy-preserving KDEs, as discussed in detail below, or may be otherwise shared directly for generating privacy-preserving KDEs (e.g., internally within a common organization that has privacy restrictions between different groups within the common organization).

Data management system 110 may be a recipient tool or other stand-alone application that can be used to generate KDE estimates for items. The tool can be provided by a data management service to recipients (e.g., in the same organization of a data set source but subject to the privacy restriction or to an external entity) so that the recipients may generate KDE estimates from sets of noise-modified linear measurements received directly from a data set source. In some embodiments, this tool may obtain the noise-modified set of linear measurements and values for the linear measurement function variables from an intermediate service or data store (e.g., data management service 210 discussed in detail below). In some embodiments, data management system 110 may be implemented as a service, like data management service 210 discussed below with regard to FIGS. 3-5, which may generate KDEs for items and/or synthetic data sets from the KDEs for items.

As indicated at 140, KDE estimation generation 140 may generate KDE value(s) for feature(s) 142 in the data set (e.g., for prospective items in the data set). For example, a privacy-preserving KDE value for one or more features for a prospective item y may be generated from the products of the set of linear measurements multiplied by the corresponding estimation function, g, given the prospective item y. Like x above, y, may represent a prospective item of the data set (though it may not be known to be an actual item of the data set) and y may be represented as a feature vector or other data structure of features. To generate the KDE value of the feature(s) of y the g function that corresponds to the $f$ function (as part of LSQ) may be used to generate the value by multiplication with respect to the individual linear measurements of the set of noise-modified linear measurements, $\tilde{F}(X)^T$ For example, KDE value of feature(s) of the prospective item y may be described as:

$$\tilde{F}(X)^T g(y) \approx KDE_x(y)$$

The respective products of the individual linear measurements and the result of the g function for y may then be combined or otherwise used to generate the KDE value. For example, a median of the averages (MoM) may be determined from the respective products. For the g function, the same values of the linear measurement parameters (e.g., $\omega$ and $\beta$) may be used when generating the result of the g function for a given y. Moreover, repeating the techniques described above with different randomness, and aggregating the results by a median of averages (MoM), may further boost the accuracy of KDEs that are privacy-preserving.

As discussed above the corresponding estimation functions for the KDE values may be a component of the RFF technique. For the RFF, the g function may be described as:

$$2 \cos(\sqrt{2} \cdot \omega^T y + \beta)$$

The same values for $\omega$ and $\beta$ that were provided when the set of noise-modified linear measurements were provided may be used to calculate the g value for the y. As discussed above, parameter $\omega$ which may describe a direction in feature space along with some addition $\beta$.

As discussed above the corresponding estimation functions for the KDE values may be a component of the FGT technique. For the FGT, the g function may be described as:

$$g_{H,r}(y) = \begin{cases} \prod_{j=1}^{d} \frac{1}{r_j!} h_{r_j}(y_j - z_j^H) & \text{if } \|y - z^H\|_2^2 \in \rho \\ 0 & \text{otherwise} \end{cases}$$

Again, where r is a vector with non-negative integer coordinates, H is a cell in the unit grid in $R^d$ and $z^H$ the center point of H as discussed above.

Please note that the previous description of generating privacy-preserving Kernel Density Estimates is a logical illustration and thus is not to be construed as limiting as to various other embodiments that may implement the above techniques.

This specification begins with a general description of a provider network that implements multiple different services, including a data management service, with techniques for generating privacy-preserving Kernel Density Estimates. Then various examples of the data management service, including different components/modules, or arrangements of components/module that may be employed as part of implementing the data management service are discussed. A number of different methods and techniques to implement techniques for generating privacy-preserving Kernel Density Estimates are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
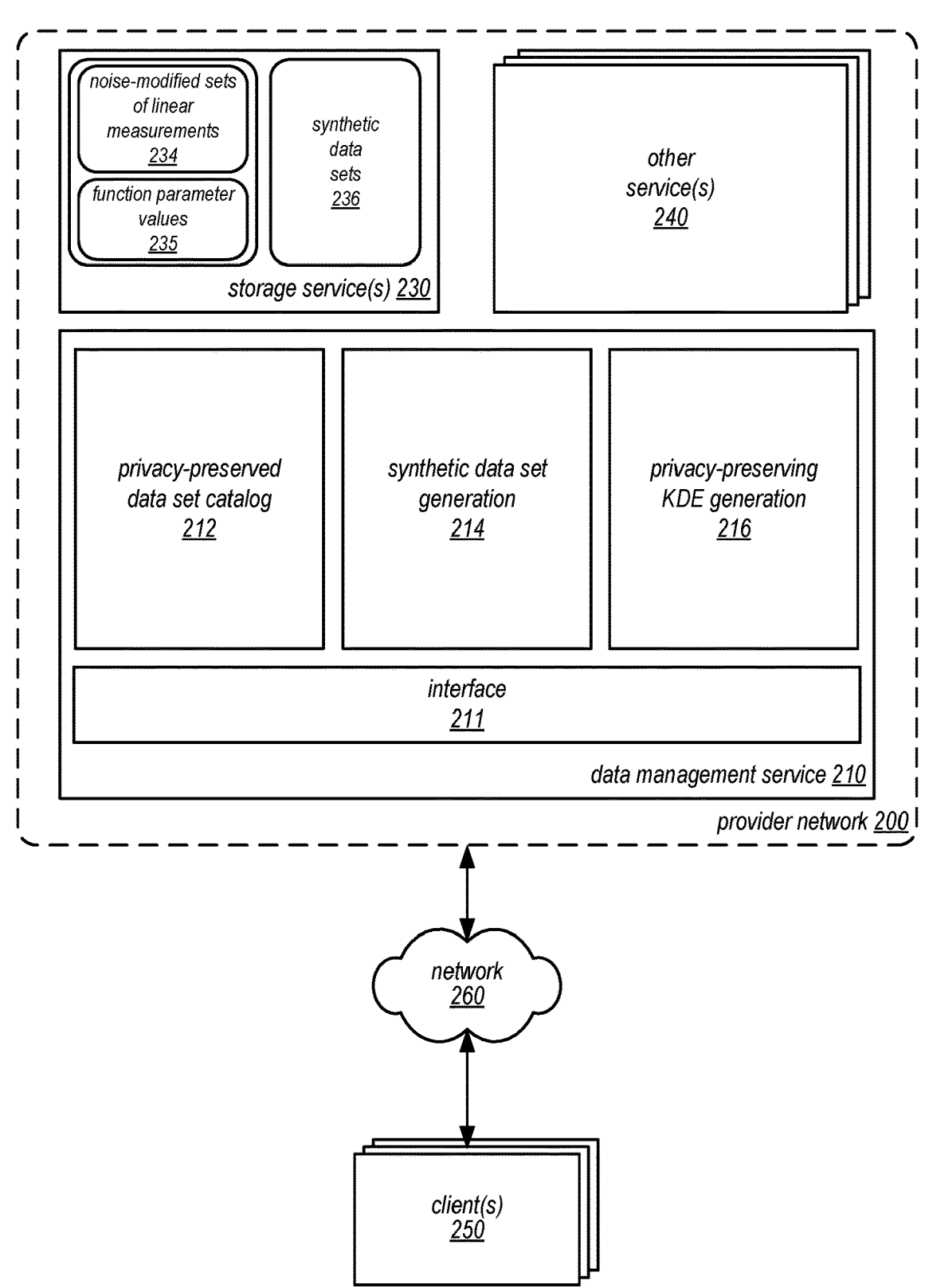
FIG. 2 illustrates an example provider network that may implement a data management service that may implement techniques for generating privacy-preserving Kernel Density Estimates, according to some embodiments.

FIG. 2 illustrates an example provider network that may implement a data management service that may implement techniques for generating privacy-preserving Kernel Density Estimates, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 (which may, in some implementations, be referred to as a "cloud provider network" or simply as a "cloud") refers to a pool of network-accessible computing resources (such as compute, storage, and networking resources, applications, and services), which may be virtualized or bare-metal. Provider network 200 can provide convenient, on-demand network access to a shared pool of configurable computing resources that can be programmatically provisioned and released in response to customer commands. These resources can be dynamically provisioned and reconfigured to adjust to variable load. For example, in some embodiments, provider network 200 may implement various computing resources or services, such as object data management service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. This compartmentalization and geographic distribution of computing hardware enables the provider network 200 to provide low-latency resource access to customers on a global scale with a high degree of fault tolerance and stability.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of machine learning search service 210 may be implemented by a particular node or may be distributed across several nodes. In some embodiments, a given node may implement the functionality of more than one service system component (e.g., more than one data store component).

Data management service 210 may implement interface 211 to allow clients (e.g., client(s) 250 or clients implemented internally within provider network 200, such as a client application hosted on another provider network service like an event driven code execution service or virtual compute service) to send various requests to generate privacy-preserving KDEs, search for privacy-preserved data sets, and generate synthetic data sets from privacy-preserving KDEs. For example, data management service 210 may implement interface 211 (e.g., a graphical user interface, programmatic interface that implements Application Program Interfaces (APIs) and/or a command line interface) may be implemented so that a client can request or submit various requests, as discussed below with regard to FIGS. 3-5.

Data management service 210 may dispatch different requests received via interface 211 to different components. For example, data management service 210 may implement privacy-preserved data set catalog 212, as discussed below with regard to FIG. 5. Privacy-preserved data set catalog 212 may provide a search index or utilize other metadata or descriptive material for data sets to make available those data sets that can be explored to generate privacy-preserving KDEs and/or generate synthetic data sets.

In various embodiments, data management service 210 may implement synthetic data set generation 214, as discussed in detail below with regard to FIG. 5, which may implement various sampling techniques using privacy-preserving KDEs to generate synthetic data sets. In this way, synthetic data sets may be generated that preserve the properties of data sets that cannot be shared directly due to privacy restrictions.

Data management service 210 may also implement privacy-preserving KDE generation 216, which as discussed below, may provide tools and features for generating privacy-preserving KDEs for data sets with private data subject to a privacy restriction.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also store various data for data management service 210, including synthetic data sets 236 (e.g., generated by synthetic data set generation 214 and stored for various purposes, such as for data set retention, as training data sets, or for various other analyses) and the artifacts for generating privacy-preserving KDEs, the set of noise-modified linear measurements 236 and the corresponding function parameter values 235 used to generate the noise-modified linear measurements 234. Storage services 230 may include object or file data stores for putting, updating, and getting data objects or files, in some embodiments. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces.

Generally speaking, clients 250 may encompass any type of client that can submit network-based requests to provider network 200 via network 260, including requests for data management service 210 discussed below. For example, a given client 250 may include a suitable version of a web browser, or may include a plug-in module or other type of code module that can execute as an extension to or within an execution environment provided by a web browser. Alternatively, a client 250 may encompass an application such as an application that may make use of data management service 210 to implement various applications. For example, a client 250 may send a request to generate a privacy-preserving KDE value for a feature in a data set. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture. In some embodiments, a client 250 may provide access to provider network 200 to other applications in a manner that is transparent to those applications.

Clients 250 may convey network-based services requests (e.g., access requests to read or write data may be via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
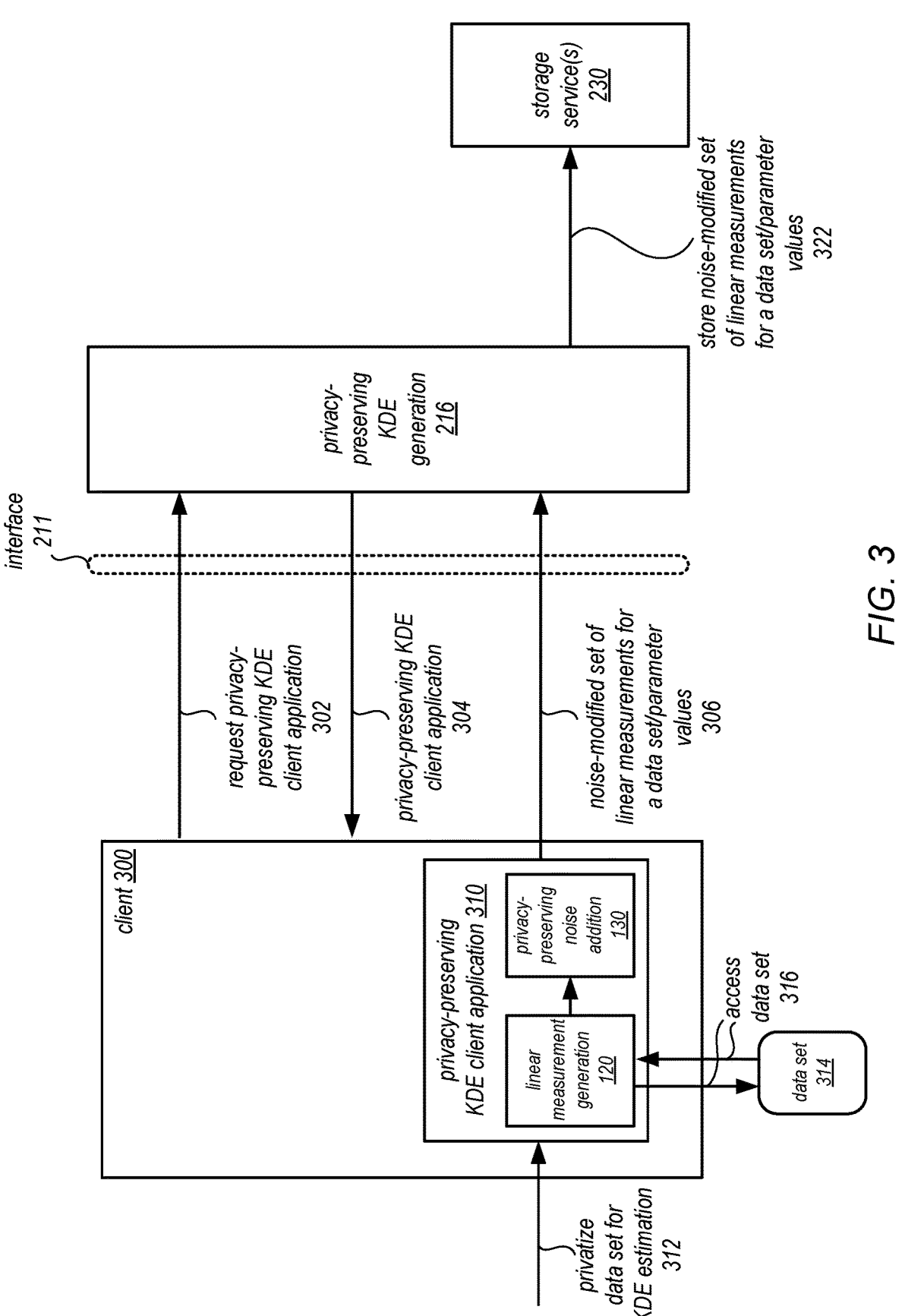
FIG. 3 illustrates a logical block diagram illustrating interactions with privacy-preserving Kernel Density Estimate client application, according to some embodiments.

As noted above, privacy-preserving KDE generation 216 may handle requests to facilitate the generation of privacy-preserving KDEs. FIG. 3 illustrates a logical block diagram illustrating interactions with privacy-preserving KDE client application, according to some embodiments. A client 300 may send a request for a privacy-preserving KDE client application 302 via interface 211. Privacy-preserving KDE generation 216 may provide the privacy-preserving KDE client application 310 (e.g., as an executable, library, or various other instructions for generating appropriate artifacts for privacy-preserving KDEs), as indicated at 304.

Privacy-preserving KDE client application 310 may implement the various techniques of linear measurement generation 120 and privacy-preserving noise addition 130 discussed above with regard to FIG. 1 (e.g., using RFF or FGT). Privacy-preserving KDE client application 310 may implement an interface (e.g., graphical, programmatic, or command line) that specifies a request to privatize a data set for KDE estimation, as indicated at 312. Because privacy-preserving KDE client application 310 is deployed at client 300, it can access the data set, as indicated at 316 without violating a privacy restriction because client 300 may have legitimate access to data set 314 without violating a privacy restriction. In some embodiments, various features of linear measurement generation 120 and privacy-preserving noise addition 130 may be selected as part of the request, including parameter values, the distribution (e.g., Gaussian or other supported distributions), or the LSQ function pair (e.g., using RFF or FGT).

As indicated at 306, the noise-modified set of linear measurements for a data set and the selected values of the parameters may be provided to privacy-preserving KDE generation 216, which may store them, as indicated at 322 in storage service(s) 322. A catalog or other index may also be updated, in various embodiments, to include represent data set 314 for privacy-preserving KDEs and synthetic data set generation. In some embodiments, requests (not illustrated) may be submitted via interface 211 to describe, annotate, or otherwise provide a description of the underlying data set which may be used for facilitating search, as discussed below.

Figure 4:
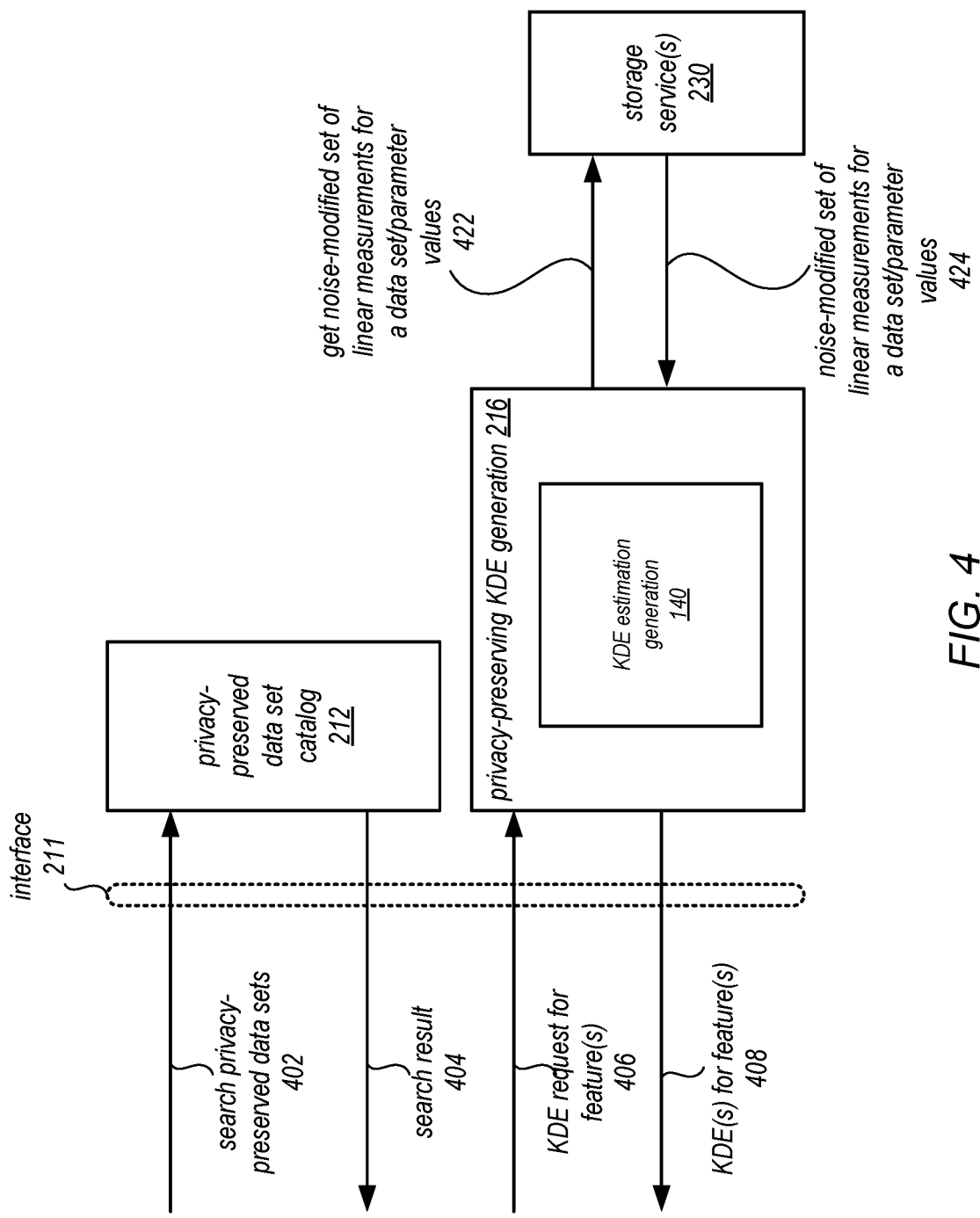
FIG. 4 illustrates a logical block diagram illustrating interactions to select data sets for generating Kernel Density Estimates for items, according to some embodiments.

FIG. 4 illustrates a logical block diagram illustrating interactions to select data sets for generating Kernel Density Estimates for items, according to some embodiments. As indicated at 402, search requests 402 may be submitted for privacy-preserved data sets to privacy-preserved data set catalog 212. Search criteria or other information may be included, which may be used to search an index or other data structure to identify data sets that satisfy (or might satisfy) the search criteria. A search result 404 may be provided. The search result may be formatted in various ways and may include, for example, information about the underlying data sets in the search result (without violating privacy restrictions). In some embodiments, example privacy-preserving KDEs for one or more items may be provided as part of a search result.

As indicated at 406, a KDE request for feature(s) in the data set may be received at privacy-preserving KDE generation 216. The request may be for a particular data set identified in a search result 404, in some embodiments. The request 406 may identify the data set and feature value(s) of feature(s) for which one or more value estimates of other features is desired (e.g., by specifying feature value(s) of feature(s) such that estimates for the feature(s) with those feature values are provided), in some embodiments. As discussed in detail above with regard to FIG. 1, KDE estimation generation 140 may be performed using the corresponding estimation function g paired with the function $f$ used to generate the set of noise-modified linear measurements. Which g function is to be used may be maintained in some embodiments if multiple $f$-g function pairs are supported (e.g., both RFF and FGT). Privacy-preserving KDE generation 216 may get 422 the noise-modified set of linear measurements for the selected data set and the parameter values from storage service(s) 230, as indicated at 424 and then perform KDE estimation generation 140 to return KDE value(s) of the feature(s), as indicated at 408.

Figure 5A:
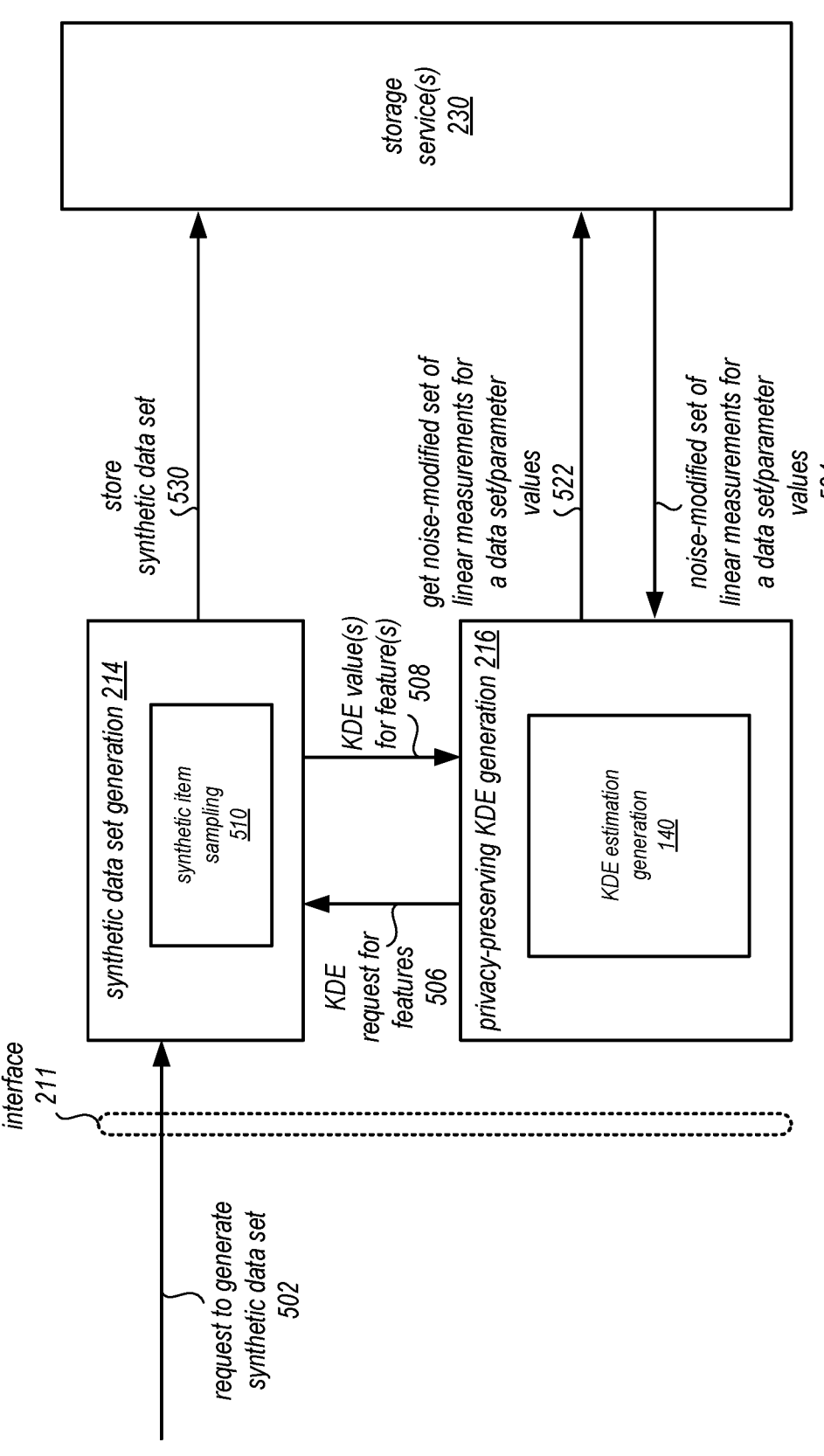
FIG. 5A illustrates a logical block diagram illustrating interactions to generate a synthetic data set from Kernel Density Estimates for items, according to some embodiments.

FIG. 5A illustrates a logical block diagram illustrating interactions to generate a synthetic data set from Kernel Density Estimates for items, according to some embodiments. As indicated at 502, a request to generate a synthetic data set may be received via interface 211 at synthetic data set generation 214. The request may specify various configuration information, such as a destination for the data set, sampling controls or variables (e.g., which sampling technique and which items to sample in order to generate custom synthetic data sets that can, for example, increase the numbers of underrepresented items in the data set to address a lack of data). In some embodiments, the request to generate the synthetic data store 502 may be made to publish the synthetic data set on behalf of the data set source, curator, or owner in storage services so that data management service 210 (or another service of provider network 200) may sell or control access to or use of the synthetic data set, in some embodiments. In some embodiments, synthetic data set generation 214 may track the number of synthetic data sets for a given underlying data set in order to evaluate whether a privacy budget for implementing differential privacy is not exceeded by generating multiple versions of a synthetic data set from a same underlying data set using the set of noise-modified set of linear measurements. In such embodiments, warnings or restrictions on creating additional synthetic data sets may be enforced to ensure that privacy budgets for are not exceeded.

Synthetic data set generation 214 may implement synthetic item sampling 510 which may use privacy-preserving KDE generation 216 to obtain KDE(s) for items. Thus, synthetic data set generation 214 may submit KDE requests 506 for feature(s) may be received at privacy-preserving KDE generation 216. The requests 506 may identify the data set and feature values(s) (e.g., a patient with an age feature with a feature value of 30), in some embodiments. As discussed in detail above with regard to FIG. 1, KDE estimation generation 140 may be performed using the corresponding estimation function g paired with the function $f$ used to generate the set of noise-modified linear measurements. Privacy-preserving KDE generation 216 may get 522 the noise-modified set of linear measurements for the selected data set and the parameter values from storage service(s) 230, as indicated at 524 and then perform KDE estimation generation 140 to return KDE value(s) feature(s), as indicated at 508.

Synthetic item sampling 510 may then sample the KDEs for item(s) to generate synthetic items to include in the synthetic data set and store them in storage services, as indicated at 530. One example of a technique that may be implemented for synthetic item sampling 510 is discussed below with regard to FIG. 5B. Other sampling techniques may be implemented in other embodiments.

Figure 5B:
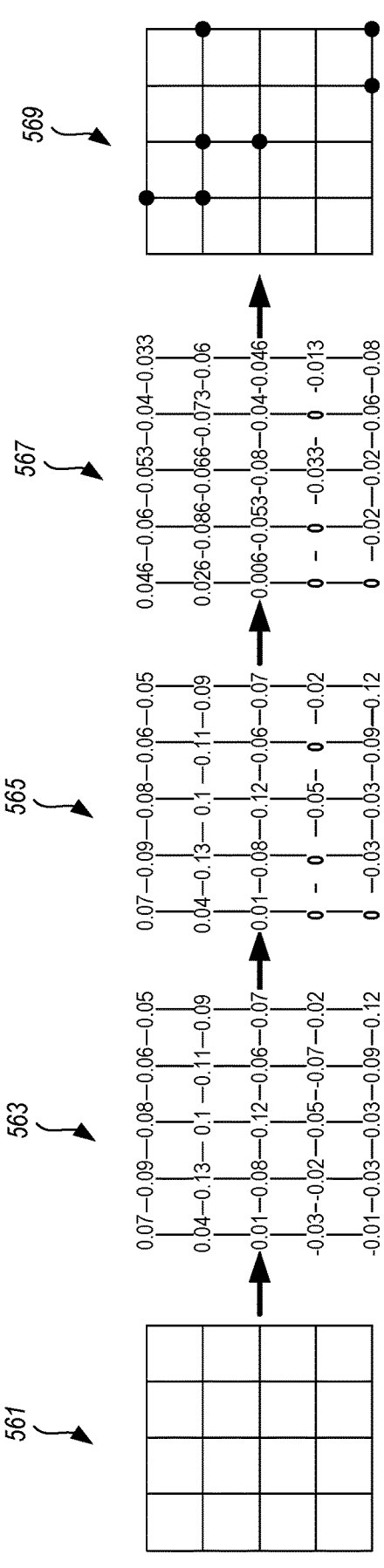
FIG. 5B illustrates a logical block diagram illustrating an example sampling technique for generating a two-dimensional synthetic data asset from Kernel Density Estimates, according to some embodiments.

FIG. 5B illustrates a logical block diagram illustrating an example sampling technique for generating a two-dimensional synthetic data asset from Kernel Density Estimates, according to some embodiments. In this example, a multi-nomial grid sampling technique may be applied where a region of the data set may be discretized into a fine grid, as indicated at 561. As indicated at 563, KDE values may be generated for each grid point. For instance, the feature value(s) that describe the respective grid points in the region may be used to generate the KDE values for the respective grid points. As illustrated at 563, the various example values are illustrated on the grid points. Negative values can be obtained in some scenarios. As indicated at 565, negative values of the KDE values at the grid points can be replaced with a value of 0.

As indicated at 567, the non-zero KDE values may be normalized. Normalization may be performed so that these non-zero KDE values add up to 1 and form a probability distribution. For instance, in the illustrated example, the non-zero estimates (at 565), add up to 1.5, so each KDE value can be divided by 1.5 to normalize to values that add up to 1. As indicated at 569, grid points, as identified by the black dots, may be sampled according to the probability distribution illustrated at 567. These seven grid points may be used for the synthetic items to include in the synthetic data set.

Although FIGS. 2-5B have been described and illustrated in the context of a provider network implementing a data management service, the various components illustrated and described in FIGS. 2-5B may be easily applied to other combinations of systems or devices, as discussed above with regard to FIG. 1. As such, FIGS. 2-5B are not intended to be limiting as to other embodiments of generating privacy-preserving Kernel Density Estimates.

FIG. 6 illustrates a high-level flowchart of various methods and techniques to implement generating privacy-preserving Kernel Density Estimates from noise-modified sets of linear measurements, according to some embodiments. As indicated at 610, a privacy-preserving kernel density estimation (KDE) value may be generated for one or more features in a data set, in various embodiments. For example, a request may cause the generation of the KDE value of the feature in the data set (e.g., as discussed above with regard to FIG. 4 or may be performed as part of generating a synthetic data set, as discussed above with regard to FIG. 5).

This technique may, as indicated at 620, identify a set of noise-modified linear measurements generated from the data set using value(s) as parameters for variable(s) of a linear measurement function, the value(s) being randomly selected before generating the set of noise-modified linear measurements. The identified set may correspond to mapping information or other information that links a data set with the artifacts, the noise-modified set of linear measurements and value(s) of the parameters for variable(s), in some embodiments. The set of noise-modified linear measurements may be generated using the various example functions $f$ discussed above, with regard to FIG. 1 and below with regard to FIG. 7. For example, respective amounts of noise are added to an initial set of linear measurements determined from the feature space for the plurality of items to generate the set of noise-modified linear measurements that satisfy the privacy restriction for the items in the data set. The corresponding values of the parameters used in the linear measurement function that were randomly selected may also be used.

As indicated at 630, a result of a corresponding estimation function applied to the feature in the data set may be multiplied with individual ones of the set of noise modified linear measurements, using the value(s) as estimation function variables to generate the result, according to some embodiments. As indicated at 640, the privacy-preserving KDE value for the feature in the data set may be determined based on product values generated by the respective multiplication of the corresponding estimation function with the individual ones of the set of noise modified linear measurements. For example a median of the average results, sometimes referred to as a Median of Means (e.g., MoM) may be used with respect to the respective results.

Figure 7:
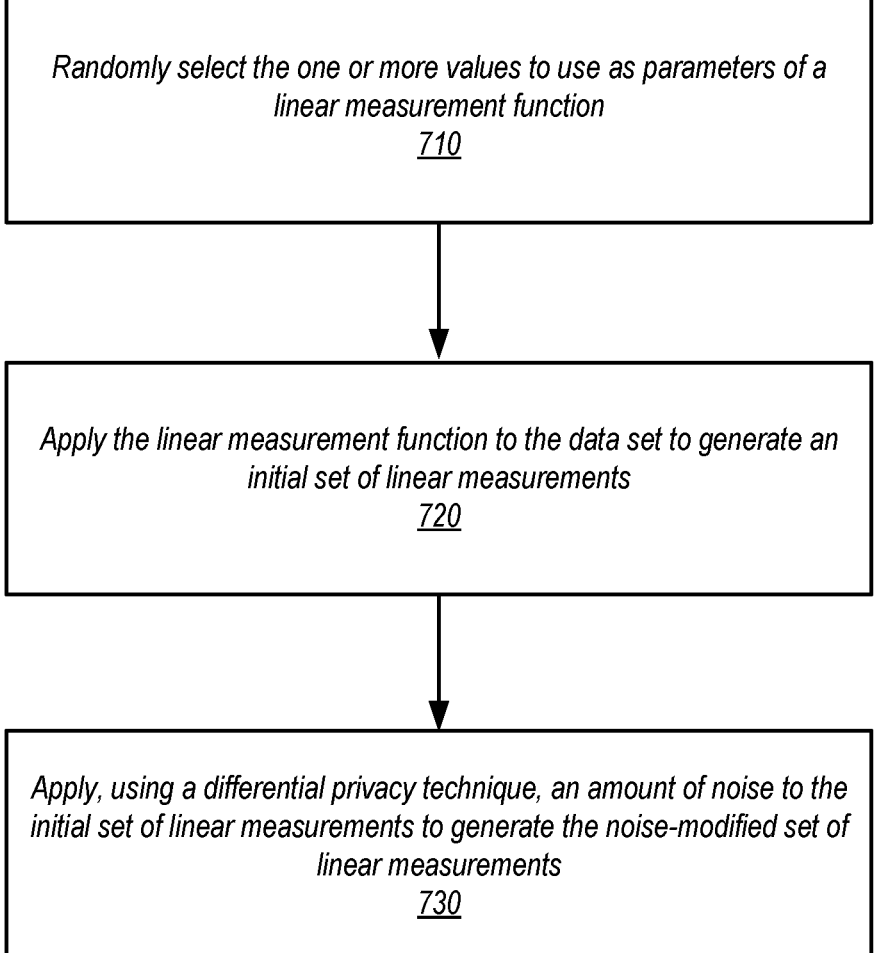
FIG. 7 illustrates a high-level flowchart of various methods and techniques to implement generating noise-modified sets of linear measurements for generating privacy-preserving Kernel Density Estimates, according to some embodiments.

FIG. 7 illustrates a high-level flowchart of various methods and techniques to implement generating noise-modified sets of linear measurements for generating privacy-preserving Kernel Density Estimates, according to some embodiments. As indicated at 710, the one or more values to use as parameters of a linear measurement function (e.g., $\omega$ or $\beta$ for RFF or r for FGT) may be randomly selected (e.g., by a user via an interface or using a random number generation function), in some embodiments. As indicated at 720, the linear measurement function to the data set to generate an initial set of linear measurements, as discussed above with regard to FIG. 1 (e.g., using the described $f$ functions of RFF or FGT). As indicated at 730, a differential privacy technique may be used to apply respective amounts of noise to the initial set of linear measurements to generate the noise-modified set of linear measurements, according to some embodiments, as discussed above with regard to FIG. 1. For example, a Laplace mechanism or some other differential privacy technique that utilizes a privacy factor, an E-based technique, may be used.

The methods described herein may in various embodiments be implemented by any combination of hardware and software. For example, in one embodiment, the methods may be implemented on or across one or more computer systems (e.g., a computer system as in FIG. 8) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
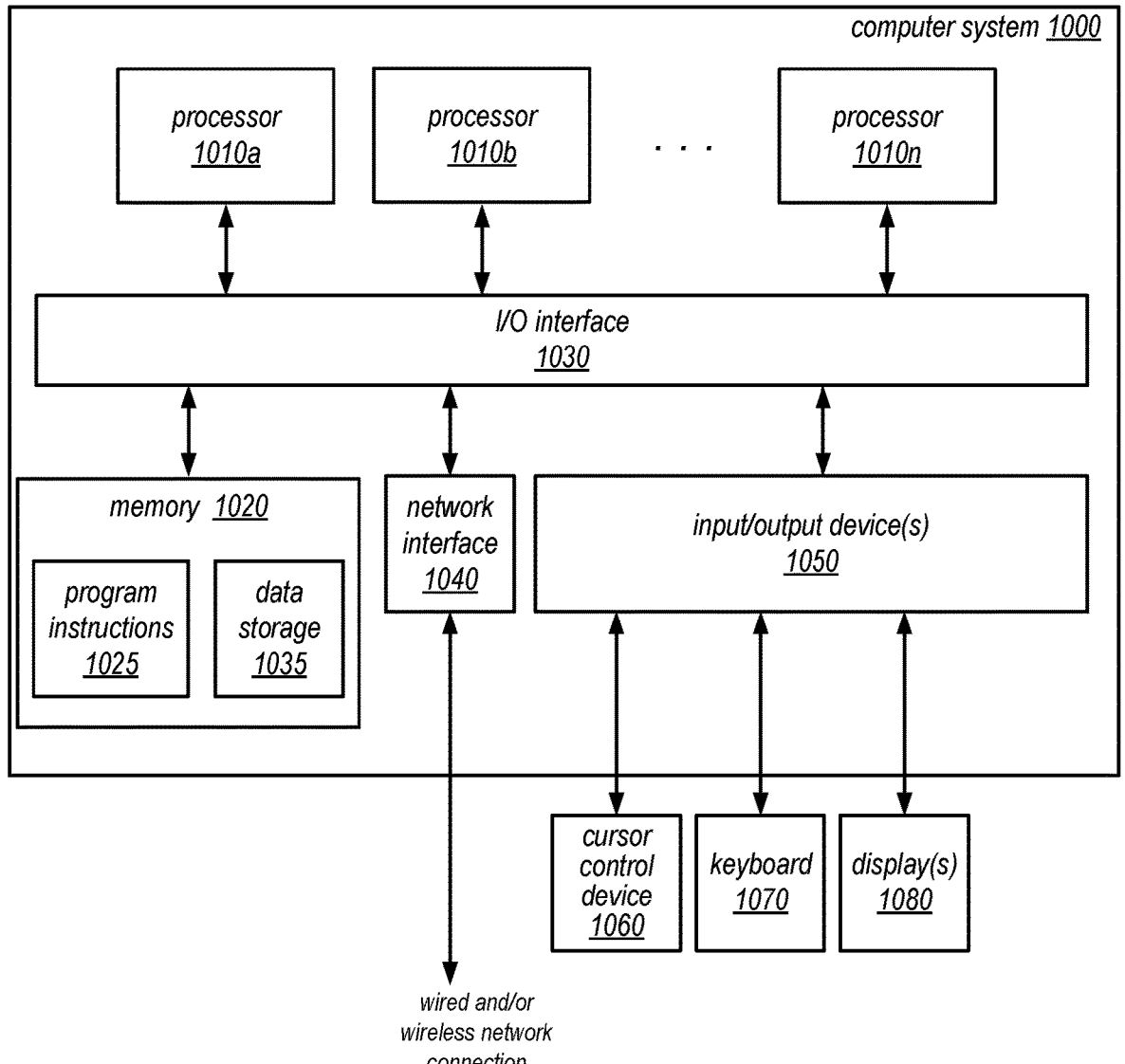
FIG. 8 illustrates an example system to implement the various methods, techniques, and systems described herein, according to some embodiments.

Embodiments of generating privacy-preserving Kernel Density Estimates as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

at least one processor; and a memory, storing program instructions that when executed by the at least one processor, cause the at least one processor to implement a data management system, configured to:

receive, via an interface of the data management system, a request to generate a privacy-preserving kernel density estimation (KDE) value for a feature in a data set, wherein the KDE value does not violate a privacy restriction enforced with respect to the data set and is less than a deviation value from a true KDE value for the feature in the dataset;

obtain a set of noise-modified linear measurements initially generated from a feature space that represents a plurality of items in the data set using one or more values as parameters for one or more variables of a linear measurement function, wherein respective amounts of noise are added to an initial set of linear measurements determined from the feature space for the plurality of items to generate the set of noise-modified linear measurements that satisfy the privacy restriction for the plurality of items in the data set, and wherein the one or more values were randomly selected before generating the set of noise-modified linear measurements;

respectively multiply a result of a corresponding estimation function paired with the linear measurement function and applied to the feature of the data set with individual ones of the set of noise-modified linear measurements, wherein the one or more values are used as estimation function variables to generate the result; and provide, via the interface of the data management system, the privacy-preserving KDE value for the feature in the data set that does not violate the privacy restriction enforced with respect to the data set in response to the request, wherein the privacy-preserving KDE value is determined based on product values generated by the respective multiplication of the corresponding KDE estimation function with the individual ones of the set of noise-modified linear measurements.

2. The system of claim 1, wherein the data management system is further configured to:

receive, via the interface, a request to generate a synthetic
data set that does not violate the privacy restriction
enforced with respect to the data set;

sample a plurality of synthetic items to include in the
synthetic data set from a plurality of privacy-preserving
KDE values generated for features in the data set
according to the set of noise-modified linear measure-
ments multiplied with respective results of the corre-
sponding estimation function for the features; and store the synthetic data set including the plurality of
synthetic items.

3. The system of claim 1, wherein the data management
system is further configured to:

receive, via the interface, a search request for data sets
according to one or more search criteria; and provide, via the interface, a result of the search request
according to the one or more search criteria including
the data set.

4. The system of claim 1, wherein the data management
system is further configured to provide to a remote comput-
ing system, a privacy-preserving KDE client application,
wherein the privacy-preserving KDE client application is
configured to:

randomly select the one or more values as the parameters
for the one or more variables for the linear measure-
ment function;

apply the linear measurement function using the selected
one or more values to the data set to generate the initial
set of linear measurements; and apply, using a differential privacy technique, the respec-
tive amounts of noise to the initial set of linear mea-
surements to generate the noise-modified set of linear
measurements.

5. The system of claim 1, wherein the data management
system is further configured to receive the set of noise-
modified linear measurements and the one or more values as
part of a request to make the data set available for privacy-
preserving KDE generation.

6. A method, comprising:

generating a privacy-preserving kernel density estimation
(KDE) value for a feature in a data set, wherein the
KDE value does not violate a privacy restriction
enforced with respect to the data set and is less than a
deviation value from a true KDE value for the feature
in the data set, comprising:

identifying a set of noise-modified linear measurements
generated from a feature space that represents a
plurality of items in the data set using one or more
values as parameters for one or more variables of a
linear measurement function, wherein respective
amounts of noise are added to an initial set of linear
measurements determined from the feature space for
the plurality of items to generate the set of noise-
modified linear measurements that satisfy the pri-
vacy restriction for the plurality of items in the data
set, and wherein the one or more values were ran-
domly selected;

respectively multiplying a result of a corresponding
estimation function paired with the linear measure-
ment function and applied to the feature in the data
set with individual ones of the set of noise-modified
linear measurements, wherein the one or more values
are used as estimation function variables to generate
the result; and providing the privacy-preserving KDE value for the
feature in the data set determined based on product
values generated by the respective multiplication of the corresponding estimation function with the indi-
vidual ones of the set of noise-modified linear mea-
surements.

7. The method of claim 6, wherein the generating the
privacy-preserving KDE value for the feature in the data set
is performed as part of generating respective privacy-pre-
serving KDE values for a plurality of different features in the
data set, and wherein the method further comprises:

generating a plurality of synthetic items to include in a
synthetic data set, wherein the plurality of synthetic
items are sampled from the plurality of privacy-pre-
serving KDE values generated for the plurality of
different features in the data set; and storing the synthetic data set including the plurality of
synthetic items.

8. The method of claim 7, further comprising receiving a
request to generate the synthetic data set, wherein the
request specifies storing the synthetic data set as a training
data set in a data store accessible to a machine learning
system.

9. The method of claim 6, further comprising receiving a
request to generate the privacy-preserving KDE value for
the feature in the data set and providing the privacy-
preserving KDE value in response to the request.

10. The method of claim 6, further comprising:

receiving a search request for data sets according to one
or more search criteria;

providing a result of the search request according to the
one or more search criteria including the data set; and receiving a selection of the data set for generating the
privacy-preserving KDE value for the feature in the
data set.

11. The method of claim 6, further comprising providing
to a remote computing system, a privacy-preserving KDE
client application, wherein the privacy-preserving KDE cli-
ent application is configured to:

randomly select the one or more values as the parameters
for the one or more variables for the linear measure-
ment function;

apply the linear measurement function using the selected
one or more values as to the data set to generate an
initial set of linear measurements; and apply, using a differential privacy technique, the respec-
tive amounts of noise to the initial set of linear mea-
surements to generate the noise-modified set of linear
measurements.

12. The method of claim 11, wherein the privacy-preserv-
ing KDE client application is configured to send the set of
noise-modified linear measurements and the one or more
values to a location requested using an interface of the
privacy-preserving KDE client application.

13. The method of claim 6, wherein the linear measure-
ment function and the corresponding estimation function of
the KDE are based on different portions of a Random
Fourier Features technique.

14. The method of claim 6, further comprising receiving
the set of noise-modified linear measurements and the one or
more values as part of a request to make the data set
available for privacy-preserving KDE generation.

15. One or more non-transitory, computer-readable stor-
age media, storing program instructions that when executed
on or across one or more computing devices cause the one
or more computing devices to implement:

identifying a feature in a data set for generating a privacy-
preserving kernel density estimation (KDE) value for
the feature in the data set, wherein the KDE value does
not violate a privacy restriction enforced with respect to the data set and is less than a deviation value from a true KDE value for the feature in the data set; and generating the privacy-preserving KDE value for the feature in the data set, wherein, in generating the privacy-preserving KDE value, the program instructions cause the one or more computing devices to implement:

identifying a set of noise-modified linear measurements generated from a feature space that represents a plurality of items in the data set using one or more values as parameters for one or more variables of a linear measurement function, wherein respective amounts of noise are added to an initial set of linear measurements determined from the feature space for the plurality of items to generate the set of noise-modified linear measurements that satisfy the privacy restriction for the plurality of items in the data set, and wherein the one or more values were randomly selected;

respectively multiplying a result of a corresponding estimation function paired with the linear measurement function and applied to the feature in the data set with individual ones of the set of noise-modified linear measurements, wherein the one or more values are used as estimation function variables to generate the result; and providing the privacy-preserving KDE value for the feature in the data set determined based on product values generated by the respective multiplication of the corresponding estimation function with the individual ones of the set of noise-modified linear measurements.

16. The one or more non-transitory, computer-readable storage media of claim 15, wherein the identifying the feature in the data set and the generating the privacy-preserving KDE value for the feature in the data set are performed as part of generating respective privacy-preserving KDE values for a plurality of different features, and wherein the one or more non-transitory, computer-readable storage media store further program instructions that when executed on or across the one or more computing devices, cause the one or more computing devices to further implement:

generating a plurality of synthetic items to include in a synthetic data set, wherein the plurality of synthetic items are sampled from the plurality of privacy-preserving KDE values generated for the plurality of different features; and storing the synthetic data set including the plurality of synthetic items.

17. The one or more non-transitory, computer-readable storage media of claim 15, storing further program instructions that when executed on or across the one or more computing devices, cause the one or more computing devices to further implement receiving a request to generate the privacy-preserving KDE value for the feature in the data set and providing the privacy-preserving KDE value in response to the request.

18. The one or more non-transitory, computer-readable storage media of claim 15, wherein a distribution for the privacy-preserving KDE value is a Gaussian distribution.

19. The one or more non-transitory, computer-readable storage media of claim 15, wherein the linear measurement function and the corresponding estimation function of the KDE value are based on different portions of a Fast Gauss Transform technique.

20. The one or more non-transitory, computer-readable storage media of claim 14, storing further program instructions that when executed on or across the one or more computing devices, cause the one or more computing devices to further implement sending a request for the set of noise-modified linear measurements and the one or more values to a data management service, wherein the set of noise-modified linear measurements and the one or more values are received from data management service as a response to the request.

\* \* \* \* \*